United States Patent [19]

van Rooij

[11] Patent Number: 5,090,947

[45] Date of Patent: Feb. 25, 1992

[54] FRICTION TRANSMISSION PROVIDED WITH A PAIR OF SHEAVES

[75] Inventor: Jacobus H. M. van Rooij, Nuenen, Netherlands

[73] Assignee: Volvo Car St. Truiden N.V., St. Truiden, Belgium

[21] Appl. No.: 622,557

[22] Filed: Dec. 5, 1990

[30] Foreign Application Priority Data

Dec. 6, 1989 [NL] Netherlands ............... 8903005

[51] Int. Cl.$^5$ .............................................. F16G 1/24
[52] U.S. Cl. ...................................... 474/240; 474/245
[58] Field of Search ............... 474/201, 237, 240, 242, 474/244, 245

[56] References Cited

U.S. PATENT DOCUMENTS 3,175,410 3/1965 Dittrich ........................ 474/240 X
4,618,338 10/1986 Rattunde et al. ................ 474/245
4,776,829 10/1988 Yamamuro et al. ........... 474/245 X
4,943,266 7/1990 Mott ............................. 474/245 X

FOREIGN PATENT DOCUMENTS 0060008 9/1982 European Pat. Off. .
0086762 8/1983 European Pat. Off. .
0127255 12/1984 European Pat. Off. .
0127266 12/1984 European Pat. Off. .
0127277 12/1984 European Pat. Off. .
2242608 3/1975 France .
2441104 6/1980 France .

Primary Examiner—Thuy M. Bui
Attorney, Agent, or Firm—Fiddler & Levine

[57] ABSTRACT

Friction transmission with opposite-pulley sheaves and transverse elements mating therewith, having an asymmetry relative to the longitudinal center plane thereof.

7 Claims, 7 Drawing Sheets

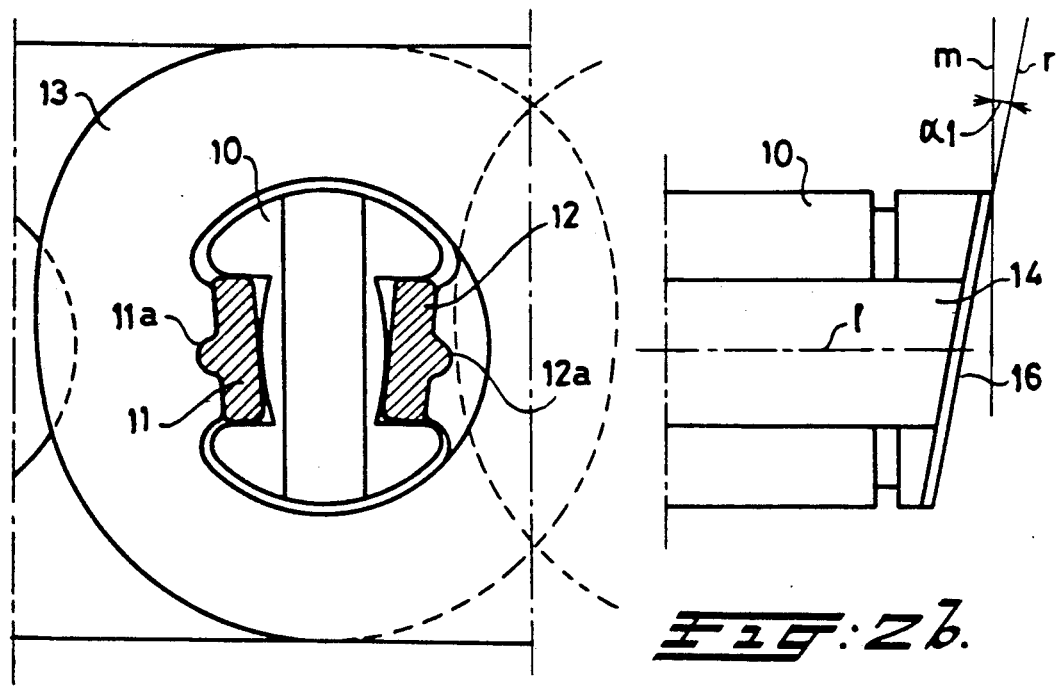
Fig. 2a.
Fig. 2b.
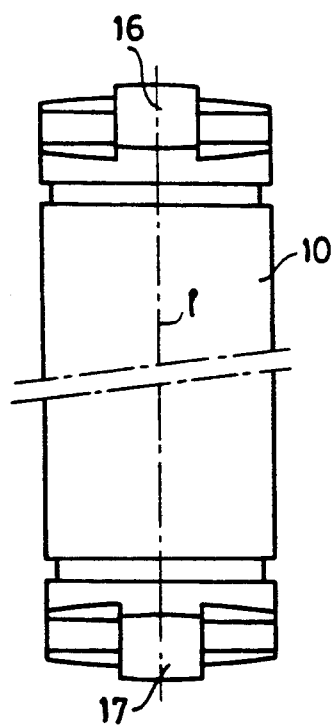
Fig. 2c.

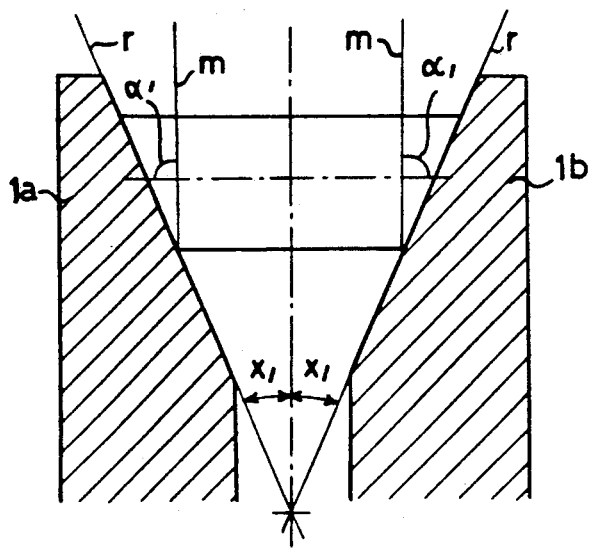
FIG. 3a.
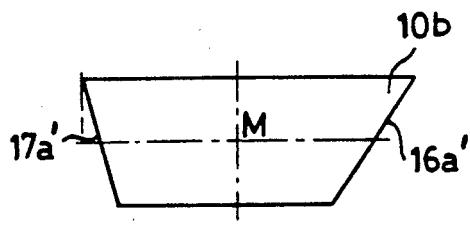
FIG. 3b.
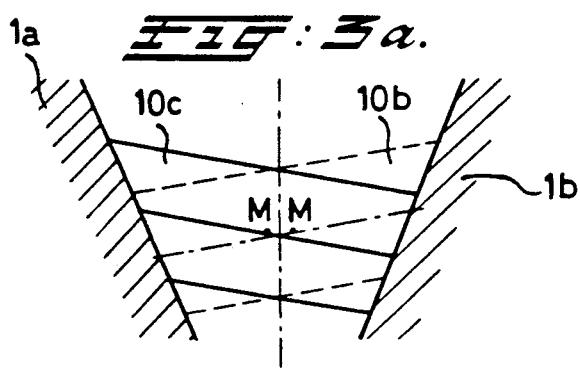
FIG. 3d.
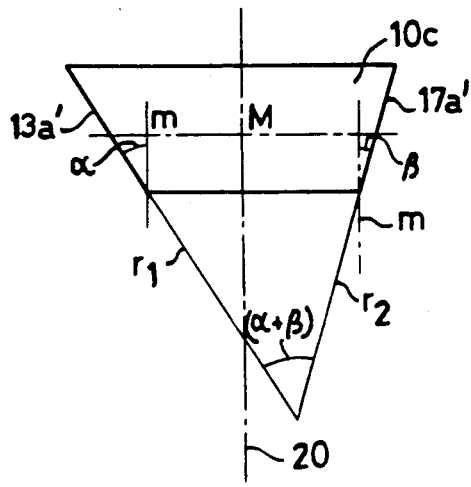
FIG. 3c.
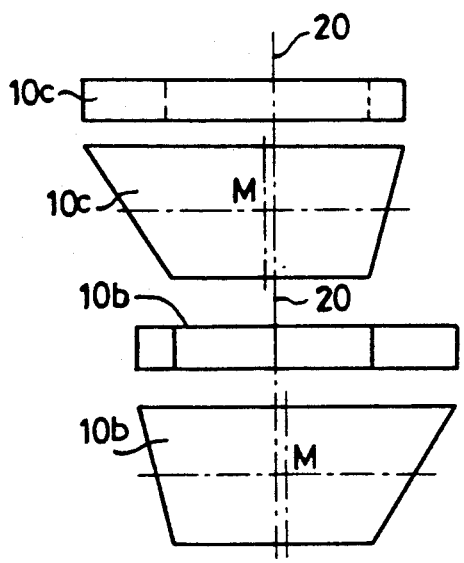
FIG. 3e.
FIG. 3f.
FIG. 3g.
FIG. 3h.

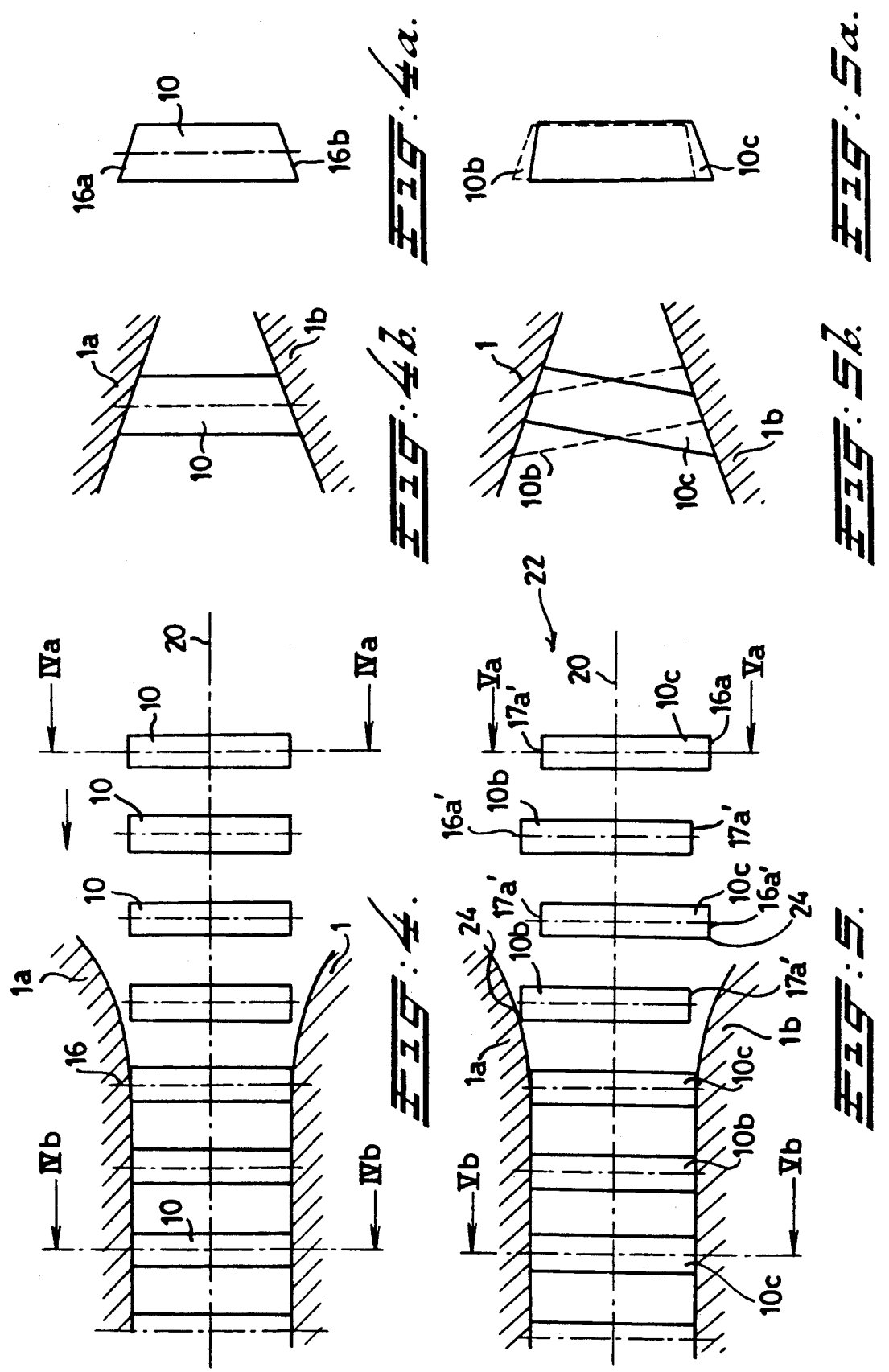

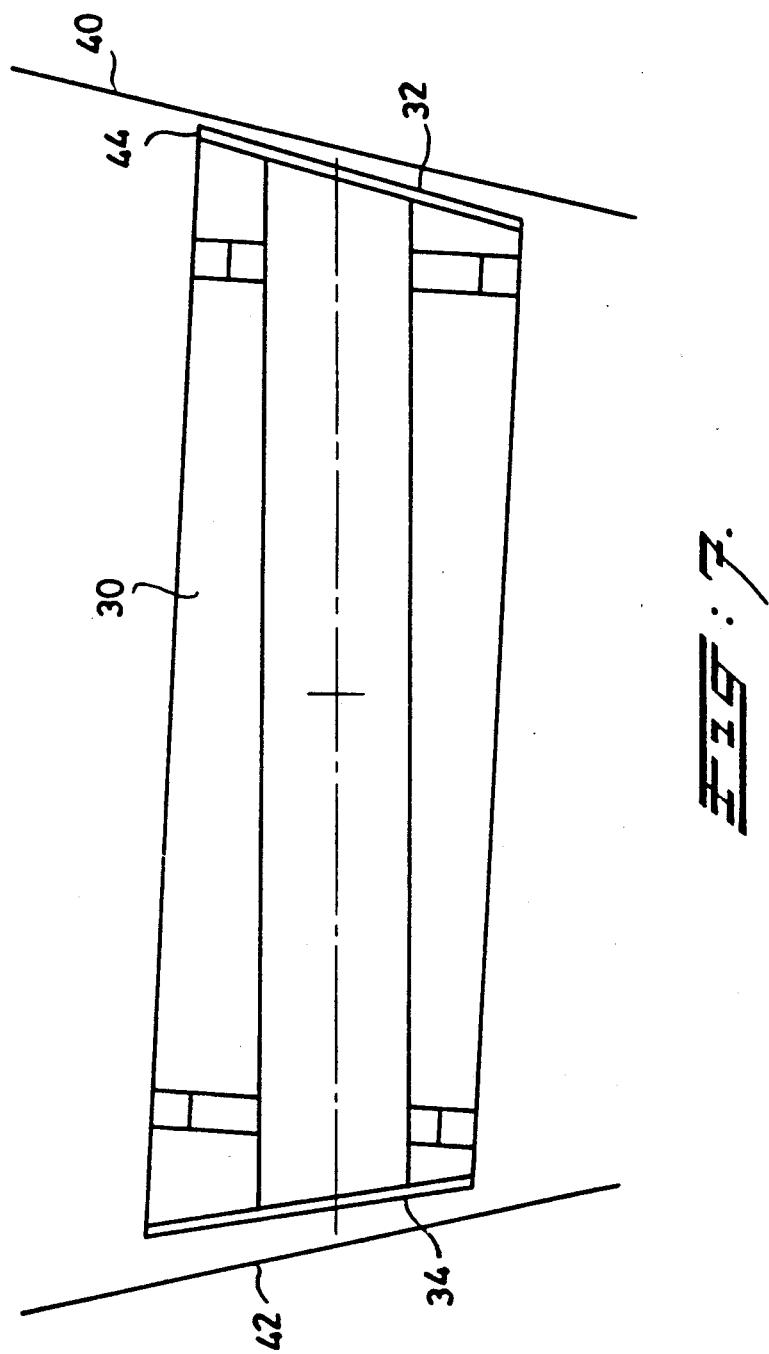

# FRICTION TRANSMISSION PROVIDED WITH A PAIR OF SHEAVES

BACKGROUND OF THE INVENTION

The invention relates to a friction transmission with as power transmission part at least opposite-lying power transmission pulley sheave surfaces and transverse elements mating therewith.

DISCUSSION OF THE PRIOR ART

Friction transmissions, in particular continuously variable transmissions, provided with transverse elements mating with the pulley sheaves of such a transmission are generally known. In a first type the transverse elements are composed of hinge pins connected by links (EU-0,060,008, EU-0,086,762) or of plate-shaped elements fitted on link elements and combined into blocks (EU-0,127,255, EU-A-0,127,266, EU-A-0,127,270), and the power transmission takes place by means of links subjected to pull. The second type uses trapezoidal transverse elements which are fitted so that they are freely slidable on an endless carrier, and which are subjected to pressure during the power transmission (U.S. Pat. No. 3,949,621).

In the case of both transmissions the problem arises (although in the case of a transmission of the second type to a greater degree) that during operation a whistling noise, generally experienced found as disturbing occurs, caused by the transverse elements entering between the pulley sheaves; the frequency of the sound vibrations thereby produced depends, of course, on the speed of rotation and the transmission ratio — in general thus on the stress reversals occurring in the transmission as a function of time.

In EU-A-0,127,270 the solution proposed for this problem is that the contact zones of the plate-shaped elements combined to blocks should be modified, in such a way that the respective blocks are designed with contact zones with mutually differing contact faces.

In practice, it was, however, found that this measure (which is difficult to apply when the transverse elements consist of hinge pins connected by links or of thin transverse elements fitted so that they can slide freely on an endless carrier, because the contact zone thereof already has a relatively small surface which cannot be reduced any further) still does not result into an adequate reduction of the disturbing noise, while this measure also leads to a situation where during operation the transverse elements are subjected to differing loads, which in itself again can be a source of vibrations and thus disturbing noise.

SUMMARY OF THE INVENTION

The invention provides a definite solution to the problem outlined above. Surprisingly it has been, in fact, found that the noise production is very considerably reduced if — departing from what is generally accepted as the norm —it is ensured that in this power transmission part as a result of the configuration of at least one of the component parts thereof an asymmetry relative to the longitudinal centre plane thereof is present, all this in such a way that at the moment at which a contact zone of a transverse element comes into contact with a contact zone of a sheave surface the bisector of the angle of which the legs are formed by the tangents of the respective contact zones of said transverse element does not coincide with the bisector of the angle enclosed by the tangent lines at the respective sheave contact zones mating with said transverse element.

In a prefered embodiment the respective tangent lines of the two contact zones of a transverse element include with lines at right angles to the longitudinal axis of said element include differing angles ($\alpha$, $\beta$), one angle ($\alpha$) over a certain value ($\delta$) being larger, and the other angle ($\beta$) over the same value being smaller than half the sum [$\frac{1}{2}$ ($\alpha + \beta$)]of these angles.

It is also possible that the power transmitting sheave surface is designed with opposite-lying contact zones alternating in the peripheral direction, and the respective tangent lines thereat include differing angles ($\alpha'$, $\beta'$) with the longitudinal centre plane, one angle ($\alpha'$) over a certain value ($\delta$) being larger, the other angle ($\beta'$) over the same value ($\delta'$) being smaller than half the sum $\frac{1}{2}$ ($\alpha' + \beta'$) of these angles. Preferably the sum of the angles ($\alpha$, $\beta$; $\alpha'$, $\beta'$) is equal to 22°, and said value ($\delta$; $\delta'$) is equal to 1°.

When each transverse element is connected, by means of intermediary pieces enclosed in the nesting space formed at each longitudinal side of said element, to the links (4) connecting transverse elements, an embodiment is possible in which the longitudinal axis of both nesting spaces encloses an acute angle with the longitudinal axis of the transverse element. When such a connection is by means of a rib projecting at the rear side of each rolling connection, the longitudinal axis of said rib encloses an acute angle with the longitudinal axis of the rolling connection.

Finally the asymmetry viewed in the lengthwise direction of the series of transverse elements or in the peripheral direction of the sheaves can be present successively in a first direction and in a second direction opposite thereto.

The proposal according to the invention, which is very easy and cheap to achieve, means that when a transverse element runs in between the sheaves the two contact zones thereof do not come into contact with the sheave mating therewith simultaneously over virtually the entire surface thereof, but that said contact zone, the tangent line of which exhibits the largest included angle, will first make contact with the top side with the sheave lying at that side, following which the transverse element tilts through the small angle $\delta$ in order thereafter to be in contact entirely with the sheave with both contact zones. This results in the fact that the single "bang" occurring during the running in of a hinge pin designed according to the state of the art — where both flanks engage simultaneously within a very short period of time — is replaced by two much softer "clicks" succeeding one another rapidly, and also a much more gradual build-up of 0 the pressure forces, thus a much lighter shock loading, and also thereby in a considerable decrease in the noise production. It was also found that by this more gradual build-up of the pressure forces the accelerations, and consequently the mass forces too, in the free part of the 5 chain situated between the pulley sheaves decrease, so that the vibration phenomena occurring therein also decrease considerably with the noise production caused by these phenomena.

It is known that when using a chain in a continuously variable transmission the "polygon effect" occurs. This means that the connecting line drawn through the hinge points of the transverse elements situated on the pulley sheaves is not a circle, but forms a polygon of which the number of angles is smaller as the pitch of the transverse elements increases. The result of this is that after the transverse element runs in between the pulley sheaves such a hinge point carries out a movement component over a certain distance at right angles to the main direction of movement of the chain parts situated between the pulley sheaves. This means that this part of the chain situated between the pulley sheaves is set in vibration. This "polygon effect" is also a cause of the production of noise found to be unpleasant, and the measures according to the invention also result in the size of this movement component decreasing; this also reduces the disturbing noise production.

Of course, the measure proposed according to the invention will result in torsion stresses occurring in the chain links or the belt-type carrier, but these can be absorbed with correct dimensioning of the above-mentioned angles. In fact, the maximum value of the angle mentioned above is determined by the torsion stress which links or belt-type carrier can withstand without problems.

The invention is explained with reference to the drawing

DESCRIPTION OF THE DRAWING

FIG. 2a is a front view of a hinge pin used therein which mates with the chain links by means of rolling connections;

FIG. 2b is a side view of the end of such a hinge pin;

FIG. 2c is a bottom view of such a hinge pin;

FIG. 3a shows how a hinge pin formed according to the state of the art mates with the two pulley surfaces;

FIG. 3b shows in side view a hinge pin formed according to the invention in a first position;

FIG. 3c shows such a hinge pin in a second position;

FIG. 3d shows the position of the hinge pin according to FIG. 3b and FIG. 3c respectively after running in between the pulley sheaves;

FIG. 3e shows in top view the position of the hinge pin according to FIG. 3c in the part of the chain not run in;

FIG. 3f shows this position in front view;

FIG. 3g shows this position in top view for the hinge pin 3b;

FIG. 3h shows this position in front view;

FIG. 4 shows schematically in top view the running in of the successive hinge pins according to the state of the art between the pulley sheaves;

FIG. 4a shows the position of these hinge pins at the plane IVa in FIG. 4;

FIG. 4b shows the position of these hinge pins at the view IVb—IVb, in FIG. 4;

FIG. 5 shows schematically in top view the running in of the hinge pins according to the invention;

FIG. 5Va shows the position of these hinge pins at the view Va—Va;

FIG. 5b shows the position of these hinge pins at the view Vb—Vb;

FIG. 7 illustrates the effect of this hinge pin;

DESCRIPTION OF PREFERRED EMBODIMENTS

Figure 1:
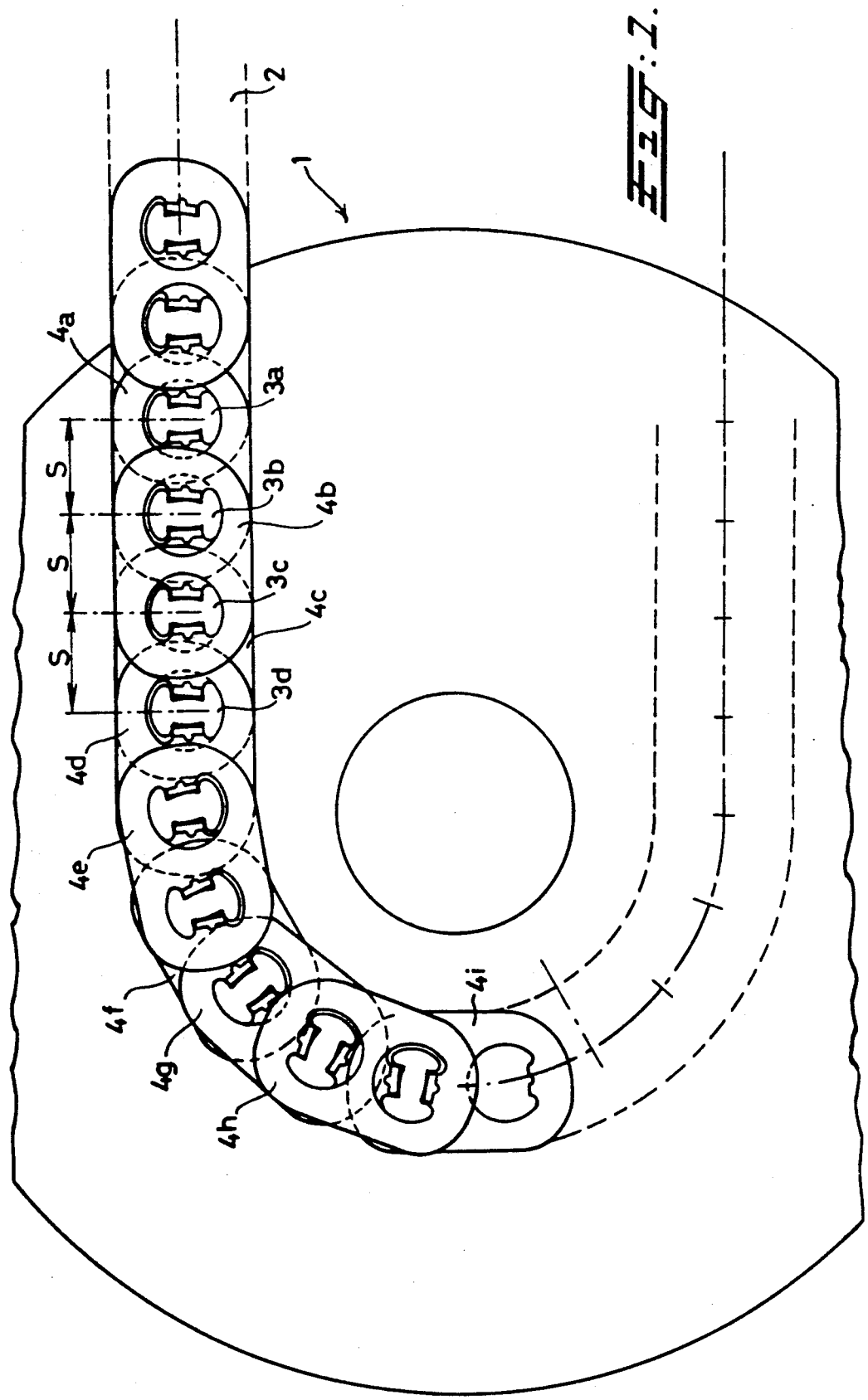
FIG. 1 is a schematic illustration of a half of a continuously variable transmission, designed with a drive chain as the power transmission element.

FIG. 1 shows schematically one half of a continuously variable transmission of the first type with a pulley sheave, indicated by reference numeral 1, and a part of the drive chain 2. This chain 2 is made up of hinge pins coupled together by links; a number of pins are indicated by the reference numerals 3a...3h, and a number of links are indicated by the reference numerals 4a...4g. The layout of such a transmission chain is known per se.

As FIGS. 2a-2c show, each hinge pin 10 mates with two intermediary pieces 11, 12, which are coupled to the links by means of the ridges 11a, 12a respectively; these intermediary pieces are accommodated in the nesting spaces 14. Each pin also mates by means of the contact zones 16, 17 with the friction surfaces of the pulley sheaves.

In the case of this known transmission chain all hinge pins have the same mutual distance (s), the pitch of the chain. This known transmission is not noiseless: the noise produced during operation, exhibiting a regular character, depends as regards sound level on the chain speed, which is determined by the running radius R and the angular velocity W of the pulley sheaves. The object of the invention is to eliminate this disadvantage.

FIG. 2b and FIG. 3a show a hinge pin 10, and in these figures the tangent line at the contact zones of this hinge pin with the pulley surfaces is indicated by r. Both tangent lines r enclose an angle $\alpha_1$ with lines at right angles to the longitudinal axis 1 of the hinge pin 10, for example with the lines m; the two angles $\alpha_1$ are, of course, equal, and their sum ($2\alpha_1$) is equal to the angle of opening ($2\alpha_1$) of the pulley sheaves 1a and 1b, as known per se and commonly used.

Now according to the invention, the two angles described above are not selected equal, but one angle ($\alpha$) is selected over a specific value ($\delta$) larger, and the other angle ($\beta$) is selected over the same value ($\delta$) smaller than half the sum ($\alpha + \beta$) of these angles. FIG. 3c shows, greatly exaggerated, how the angle $\alpha$ between the tangent line $r_1$ at the contact zone 16a' and the line m is greater than the angle $\beta$ between the tangent line $r_2$ at the contact zone 17a and the same line m, while ($\alpha + \beta$) is equal to the angle of opening of the pulley sheaves, thus to the angle indicated in FIG. 3a as $2\alpha_1$. Of course, as already said, the actual situation in these figures is shown considerably exaggerated; in practice, in which the sum of the angles is, for example, equal to 22°, the value $\delta$ will be equal to approximately 1°.

Relative to the plane of symmetry 20 of the pulley sheaves 1a, 1b, the hinge pins 10 can have one of the two positions indicated in FIG. 3b, 3c. This does not, however, mean that after accommodation in a transmission chain and during operation the centre points m of the two hinge pins lie in the plane of symmetry 20. FIG. 3d shows the position of the hinge pins 10b and 10c after running in between the pulley sheaves 1a and 1b (this will be reverted to later), while FIGS. 3e and 3f, on the one hand, and FIGS. 3g and 3h, on the other, in top view and front view respectively, show the position of the hinge pins 10c and 10b relative to the plane of symmetry 20 when these hinge pins are not in engagement with the pulley sheaves. It appears that in the latter situation the hinge pins spring back into a position in which the distance between their centre points m is smaller than in the situation according to FIG. 3d. If then, when assembling the chain, the hinge pins are fitted alternately in the links, thus in the position shown in FIG. 3b and in the position shown in FIG. 3c respectively, the respective contact zones will not lie in one plane, but will be staggered relative to one another. The situation resulting from this can be seen clearly from a comparison of FIGS. 4 and 5. FIG. 4 shows in top view and very schematically a transmission chain according to the state of the art, thus with a number of hinge pins 10 designed in the manner shown in FIG. 3a; the situation at the plane IVa—IVa, at right angles to the plane of symmetry 20, is shown in FIG. 4a, while the situation in the plane IVb—IVb, thus after the hinge pins run in between the pulley sheaves 1a, 1b, is indicated in FIG. 4b. In both FIGS. 4 and 5 the pulley sheaves are shown developed. It can be seen from FIG. 4 that during the running in the hinge pins 10 according to the state of the art always touch the surfaces of the pulley sheaves 10a, 10b simultaneously with both contact zones 16a, 17a, which in practice results in a single, clearly audible click. It is these clicks or bangs occurring during the running in which lead to the whistling noise produced during the operation of the transmission, a noise which is found objectionable in practice.

FIG. 5, in conjunction with FIGS. 5a and 5b, shows the situation which results from the measures according to the invention. The contact surface 16a' of the hinge pins 10b, which are assembled in the manner shown in FIG. 3b, viewed from the infeed direction 22, compared with the situation shown in FIG. 4 will be moved to the right relative to the plane of symmetry 20, while the same contact surface 16a' of the hinge pins 10c, which are assembled in the manner shown in FIG. 3c, is moved to the left relative to the plane of symmetry 20. The result is thus that a hinge pin such as the pin 10b during running in first comes into contact with the pulley sheave with the top front side 24 of the contact surface 16a', then viewed in the movement direction 22 tilts to the left, and only then comes into contact with the pulley sheave 1b with the contact surface 17a'. The single bang normally occurring when the hinge pins run in between the pulley sheaves is replaced by two much quieter clicks of much lower amplitude occurring shortly after one after. The corresponding situation applies for a pin such as the pin 10c: here again the point 24 will come into contact with the pulley sheaves first, after which the pin tilts to the right until the two contact zones 16a' and 17a' are resting against the respective walls of the pulley sheaves.

FIG. 5a shows what the position of the pins 10a, 10b is when they pass the plane Va—Va, while FIG. 5b shows by solid and dotted lines respectively — but very greatly exaggerated — the positions which the hinge pins assume while they are running their course between the pulley sheaves, seen at the plane Va-Vb.

In practice, it has been found that with the measures according to the invention, which are particularly simple to carry out, a very considerable reduction in noise production is obtained.

It is pointed out again that in the figures the differences between the angles $\alpha$ and $\beta$ are shown greatly exaggerated: in practice, this difference ($2\beta$) will not be much greater than 2°-3°, and thus will hardly be visible with the naked eye.

Figure 6:
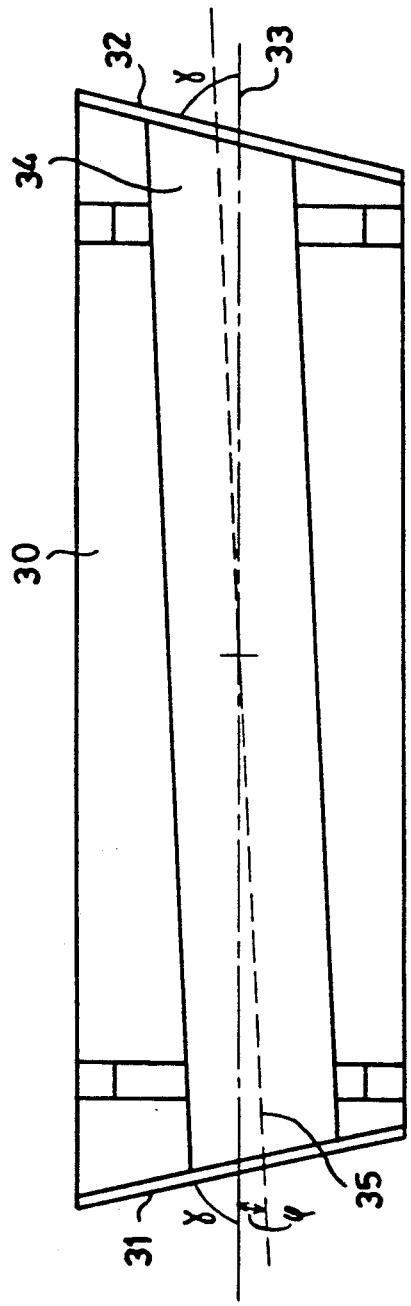
FIG. 6 relates to a modified hinge pin with which the envisaged effect can be achieved.

The inventive idea is based can, however, also be put into effect in other ways. FIG. 6 shows a hinge pin 30 with contact zones 31, 32 which both in the usual manner enclose the same angle $\gamma$ with the longitudinal axis 33 of 0 the pin. The hinge pin is also provided in the known manner with a nesting space 34 running in the lengthwise direction for the accommodation of an intermediary piece, for example designed like the intermediary pieces 11 and 12 shown in FIG. 2a. While in the case of the hinge pins according to the state of the art (FIG. 2a-2c) the nesting space for these intermediary pieces (for example, indicated by 14 in FIG. 2b) has a longitudinal axis which is parallel to the longitudinal axis of the hinge pin, this is not the case with the hinge pin 30 shown in FIG. 6: there the longitudinal axis 35 of this recess encloses an angle $\zeta$ (which in FIG. 6 is shown greatly exaggerated) which in practice will be 1°-2° with the longitudinal axis 33 of the hinge pin. During use the hinge pin 30 will assume a position relative to the pulley friction surfaces such as that, for example, shown schematically in FIG. 7 relative to the friction surfaces 40 and 42, and thus will first come into contact with the pulley surface 40 with the top side 44 of the contact zone 32; only after that does the contact zone 34 come into contact with the pulley surface 42. If the hinge pins are fitted alternately in the manner indicated above, the envisaged effect is obtained.

Figure 8:
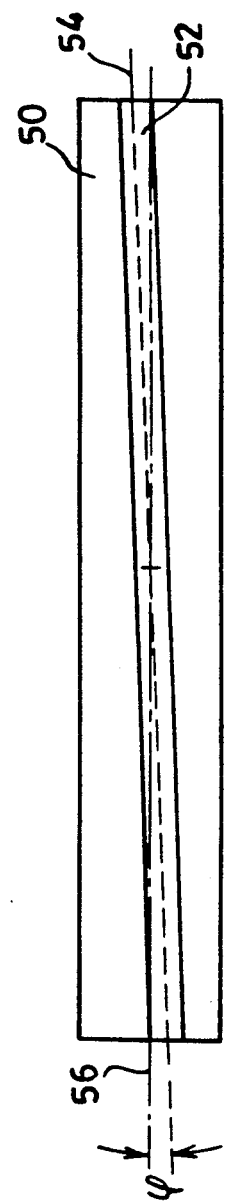
FIG. 8 shows a side, view of a modified rolling connection by means of which the effect envisaged with the invention is also achieved.

Instead of the nesting spaces for the intermediary pieces, the ridges thereof — by means of which the intermediary pieces are coupled to the hinge pins — can also be designed in the manner described above, all this as shown in FIG. 8. FIG. 8 shows an intermediary piece 50 of the type indicated by 11 and 12 in FIG. 2a, of which the "ridge" 52 — corresponding to the ridges 11a, 12a respectively — is designed in such a way that the longitudinal axis 54 thereof encloses an angle with the longitudinal axis 56 of the intermediary piece itself. If an intermediary piece designed in this way is used in conjunction with an "ordinary" hinge pin, thus a hinge pin in which the longitudinal axis of the nesting space for this intermediary piece is parallel to the longitudinal axis of the hinge pin itself, the envisaged effect is also achieved.

Figure 11:
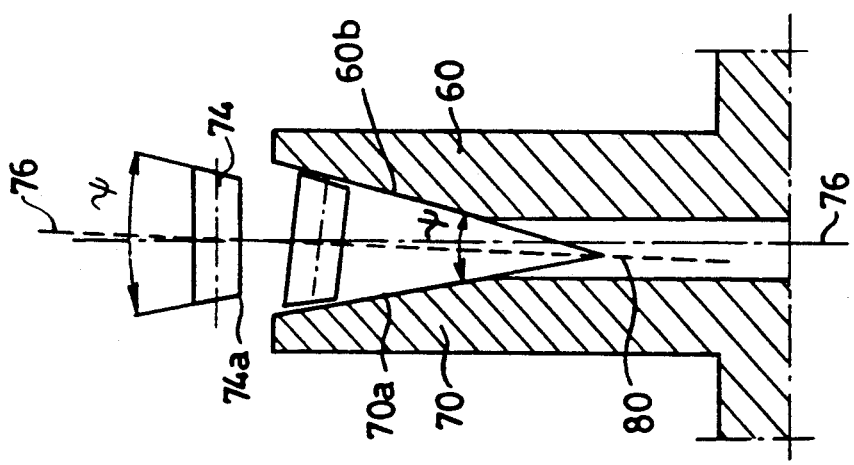
FIGS. 9, 10 and 11 relate to a modification of the friction surfaces of the pulley sheaves which results in the effect envisaged with the invention.
Figure 10:
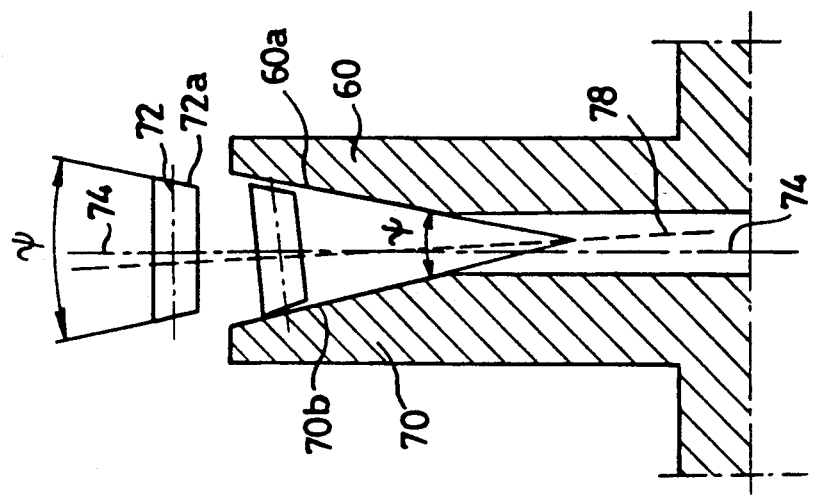
Figure 9:
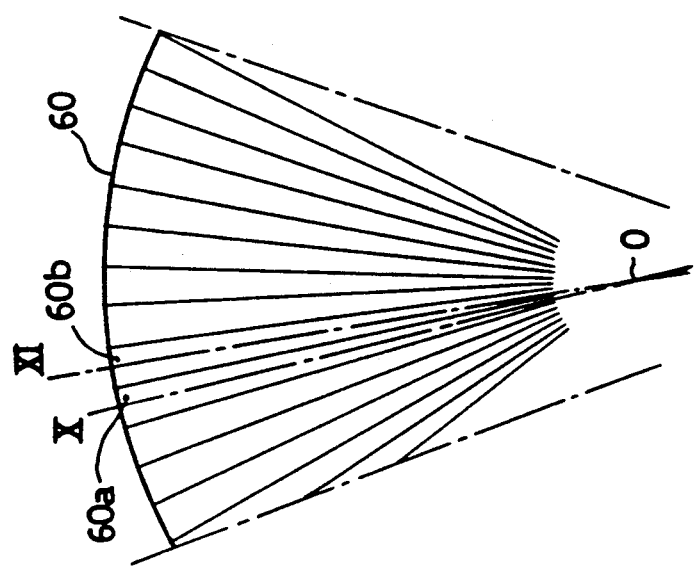

This effect can also be achieved through a modification of the friction surfaces of the pulley sheaves, in such a way that the bisector of the angle enclosed between the lines of contact on two opposite-lying pulley sheave surface parts does not coincide with the axis of the transmission using these pulley sheaves. FIG. 9 shows a part of a pulley sheave 60 with alternating contact zones indicated by 60a and 60b respectively, which differ from each other to the extent that the lines of contact thereof enclose differing angles with the longitudinal centre plane of the transmission. This difference is found again in the contact zones of the pulley sheave 70, and in the figure indicated by 70a and 70b. In FIGS. 10 and 11 reference numerals 72 and 74 indicate a transverse element which is symmetrical relative to the longitudinal centre plane 74, 76 respectively thereof, and whose lines of contact at the respective contact zones enclose an angle $\zeta$. This same angle $\zeta$ is enclosed by the lines of contact at opposite-lying contact zones of the pulley sheaves 60 and 70, but the bisector 78, 80 of this angle does not coincide with the longitudinal centre plane 74, 76 respectively of the pulley sheaves 60, 70 respectively. FIG. 10 shows the situation at the section O-X in FIG. 9; it can be seen that relative to the longitudinal centre plane 74 the bisector 78 runs from lower right to upper left. FIG. 11 shows the situation at the section O-XI, and here the configuration of the contact zones 70a-60b is such that the bisector 80 runs from bottom left to top right relative to the longitudinal centre plane 76.

The result is that when a transverse element 72 runs in between the pulley sheaves 60 and 70 at the contact zones 60a-70b the right bottom side 72 of said transverse element comes into contact first with a contact zone, in this case the contact zone 60a; when a transverse element such as the transverse element 74 runs in between the contact zones 60b-70a of the pulley sheaves 60, 70 respectively, it will first make contact with the left bottom side 74a. The envisaged object is herewith achieved.

What is claimed is:

1. A friction transmission comprising: a pulley having angled surfaces with contact zones thereon; and transverse elements adapted to extend between said pulley surfaces, said transverse elements having contact zones mating with the contact zones on said pulley surfaces, in which the contact zones on said transverse elements lie at an angle to each other such that upon initial contact between a contact zone of a transverse element with a contact zone of a pulley surface, the bisector of the angle formed by lines tangent to the respective contact zones of said transverse element does not coincide with the bisector of the angle between lines tangent to the pulley contact zones mating with the contact zones on said transverse elements.

2. Transmission according to claim 1, in which the respective tangent lines (r1, r2) of the two contact zones (16a', 17a') of a transverse element (10) with lines (m) at right angles to the longitudinal axis of said element include differing angles ($\alpha$, $\beta$), one angle ($\alpha$) over a certain value ($\delta$) being larger, and the other angle ($\beta$) over the same value being smaller than half the sum of these angles.

3. Transmission according to claim 2 in which the sum of the angles ($\alpha$, $\beta$; $\alpha'$, $\beta'$) is equal to 22°, and said value ($\delta$; $\delta'$) is equal to 1°.

4. Transmission according to claim 1, in which the power transmitting sheave surface (60) is designed with opposite-lying contact zones (60a, 60b) alternating in the peripheral direction, and the respective tangent lines thereat include differing angles ($\alpha'$, $\beta'$) with the longitudinal centre plane, one angle ($\alpha'$) over a certain value ($\delta$) being larger, the other angle ($\beta'$) over the same value ($\delta'$) being smaller than half the sum $\frac{1}{2}(\alpha' + \beta')$ of these angles.

5. Transmission according to claim 1, which each transverse element (30) is connected, by means of intermediary pieces (11, 12) enclosed in a nesting space (34) formed at each longitudinal side of said element, to links (4) connecting said transverse elements, and a longitudinal axis of both nesting spaces (34) encloses an acute angle with a longitudinal axis of the transverse element.

6. Transmission according to claim 1, in which each transverse element (30) is connected, by means of intermediary pieces (50) enclosed in a nesting space (34) formed at each longitudinal side of said element, to links (4) connecting transverse elements, by means of a rib (52) projecting at a rear side of each connection, and a longitudinal axis (54) of said rib (52) encloses an acute angle with a longitudinal axis (33) of the connection.

7. Transmission element according to claim 1 in which an asymmetry viewed in the lengthwise direction of a series of transverse elements or in the peripheral direction of the sheaves is present successively in a first direction and in a second direction opposite thereto.

* * * * *